(12) United States Patent
Potts et al.

(10) Patent No.: US 6,655,202 B2
(45) Date of Patent: Dec. 2, 2003

(54) DYNAMIC FORCE MEASUREMENT SYSTEM FOR TIRE TESTING STATION

(75) Inventors: Gerald R. Potts, Fairlawn, OH (US); Erik F. Knuth, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/878,017

(22) Filed: Jun. 8, 2001

(65) Prior Publication Data

US 2002/0020214 A1 Feb. 21, 2002

Related U.S. Application Data

(60) Provisional application No. 60/254,179, filed on Dec. 8, 2000, provisional application No. 60/245,896, filed on Nov. 3, 2000, and provisional application No. 60/210,308, filed on Jun. 8, 2000.

(51) Int. Cl.[7] ..................... G01M 17/02; E01C 23/00
(52) U.S. Cl. .................. 73/146; 73/826; 701/37
(58) Field of Search .................. 73/146–146.8, 73/462, 862, 123, 477, 663, 826, 11; 364/424; 701/37; 340/540, 521

(56) References Cited

U.S. PATENT DOCUMENTS

| 3,287,966 A | 11/1966 | Haan et al. |
|---|---|---|
| 4,149,416 A | 4/1979 | Harant |
| 4,359,896 A | 11/1982 | Brown, Jr. et al. |
| 4,442,499 A | 4/1984 | Sekula et al. |
| 4,691,564 A | 9/1987 | Potts et al. |
| 4,856,324 A | 8/1989 | Potts |
| 5,060,959 A | * 10/1991 | Davis et al. ........ 280/6.1 |
| 5,231,374 A | * 7/1993 | Larsen et al. ........ 340/540 |
| 5,323,644 A | 6/1994 | Schaefer |
| 5,445,013 A | 8/1995 | Clayton, Jr. et al. |

FOREIGN PATENT DOCUMENTS

| DE | 299 13 630 U 1 | 6/2000 |
|---|---|---|
| GB | 1485290 | 1/1974 |
| WO | WO 01/02826 A1 | 1/2001 |

* cited by examiner

Primary Examiner—Andrew H. Hirshfeld
Assistant Examiner—Marissa Ferguson
(74) Attorney, Agent, or Firm—Fred H. Zollinger, III; Michael R. Huber

(57) ABSTRACT

The invention provides a system and method for measuring tire forces wherein the force contributions of the test machine may be separated from the force contributions of the tire. The invention achieves the separation of the forces by equipping the test station with a plurality of accelerometers that allow the forces and the moments of the components of the measurement station to be calculated and accounted for in the overall force measurement. In one embodiment, the test station uses a slip ring disposed between the rotating rotor to which the tire is mounted and the stationary bearing housing to allow data to be easily gathered from the accelerometers mounted on the rotor. The slip ring also allows tires to be easily mounted and dismounted.

20 Claims, 5 Drawing Sheets

DYNAMIC FORCE MEASUREMENT SYSTEM FOR TIRE TESTING STATION

BACKGROUND OF THE INVENTION

1. Technical Field

The present invention generally relates to systems used to measure forces in pneumatic tires. More particularly, the present invention relates to a system for measuring tire force generation and tire force transmission as a loaded tire rolls over a road surface. Specifically, the present invention relates to a system and method for measuring tire forces wherein the force contributions of the test machine are separately measured from and added into the resulting force measurement.

2. Background Information

Tire manufacturers desire to compare the forces generated and transmitted by different tire constructions to determine a preferred tire construction for a particular application. The subject forces are created when a loaded tire rolls over a road surface. A tire rolling over a road surface creates vibration forces that will create tire noise. Minimizing or controlling tire noise is one of the objects of tire design. Force testing provides the tire designer a method for comparing alternative tire constructions.

Tire forces have been measured in the past by mounting the subject tire on a rim that is then mounted to a rotor. The rotor is rotatably mounted on a bearing housing that is connected to a load cell or force measurement device. The load cell or force measurement device is configured to measure three axial forces and the moments about the reference axes. One type of load cell is known in the art as a Kistler load cell and is available from Kistler of Switzerland. The tire is brought into contact with a rotating simulated road surface that causes the tire and rotor to rotate. The load cell measures the forces and delivers the measurements to a recording device such as a computer that records the load cell forces. The readings may be displayed for use by investigators in a variety of different ways. One method of displaying the data is to perform a Fourier transformation on the data to display it in the frequency domain.

In past systems, the inertial forces experienced by the rotor, the bearing housing and the measurement device would be measured by the load cell in combination with the tire forces. The inertial forces do not influence force measurements at low frequencies because the inertial forces are generally higher frequency forces. At the higher frequencies, the machine forces combine with the tire forces to yield useless results. For instance, those skilled in the art know that tires have certain measurable resonances such as the resonances caused by the tire cavity and the body cords. Another known resonance occurs in the wheel to which the tire is mounted. Although these resonances are known to exist, the existing tire force measurement systems do not accurately reveal these resonances because the forces of the test machine hide these resonances. The persons testing the tires desire a system that accounts for the machine forces when it measures the tire forces.

In addition to the force accounting, the users desire a system that is as easy to use as prior art systems. When multiple tire constructions must be measured and compared, each tire must be loaded onto the test machine and tested. The test tires are currently loaded onto machines by using standard lug nuts to hold the wheel to the rotor. The entire loading and test process takes less than 5 minutes. Any improved system should be as quick and easy to use as these systems so that they will be readily accepted by those who perform the tests.

SUMMARY OF THE INVENTION

The invention provides a system and method for measuring tire forces wherein the force contributions of the test machine are separately measured and accounted for in the overall measurement of the tire force. The invention accounts for the machine forces by equipping the test station with a plurality of accelerometers that allow the forces and the moments of the components of the test station to be independently calculated from the overall measured forces.

The system of the invention allows wheels to be quickly mounted to the test station so that they may be tested as quickly as in known test stations. In one embodiment of the invention, a slip ring is disposed between the bearing housing and rotor so that the data from the rotor accelerometers may be gathered by the data gathering device of the test station. The slip ring allows the tire-wheel assemblies to be mounted and dismounted from the rotor without disconnecting the accelerometers from the data gathering device.

BRIEF DESCRIPTION OF THE DRAWINGS

Similar numbers refer to similar parts throughout the specification.

DETAILED DESCRIPTION OF THE INVENTION

Figure 1:
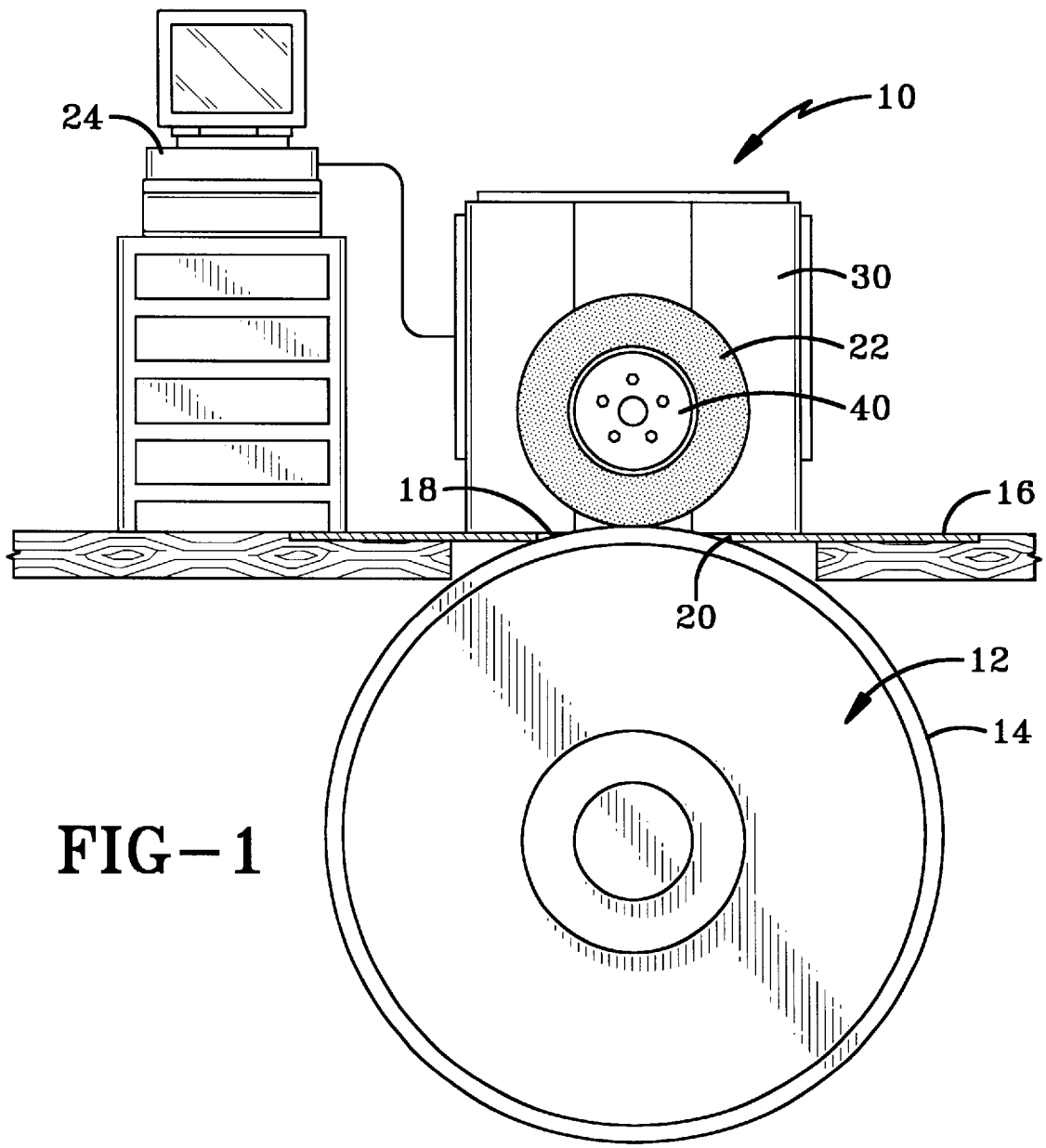
FIG. 1 is a front view of the system for measuring tire forces according to the present invention.
Figure 2:
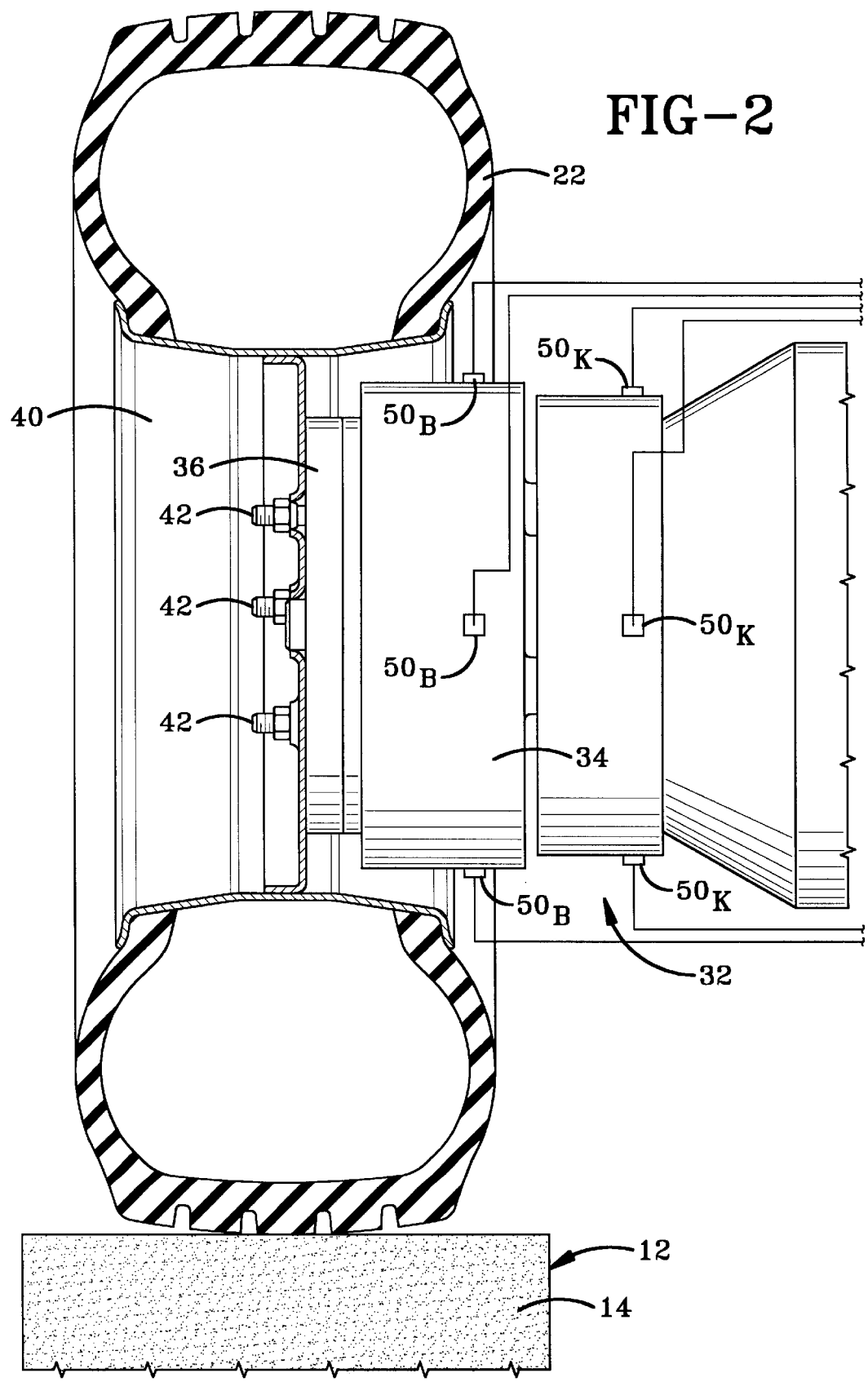
FIG. 2 is a side view of the system of FIG. 1.
Figure 3:
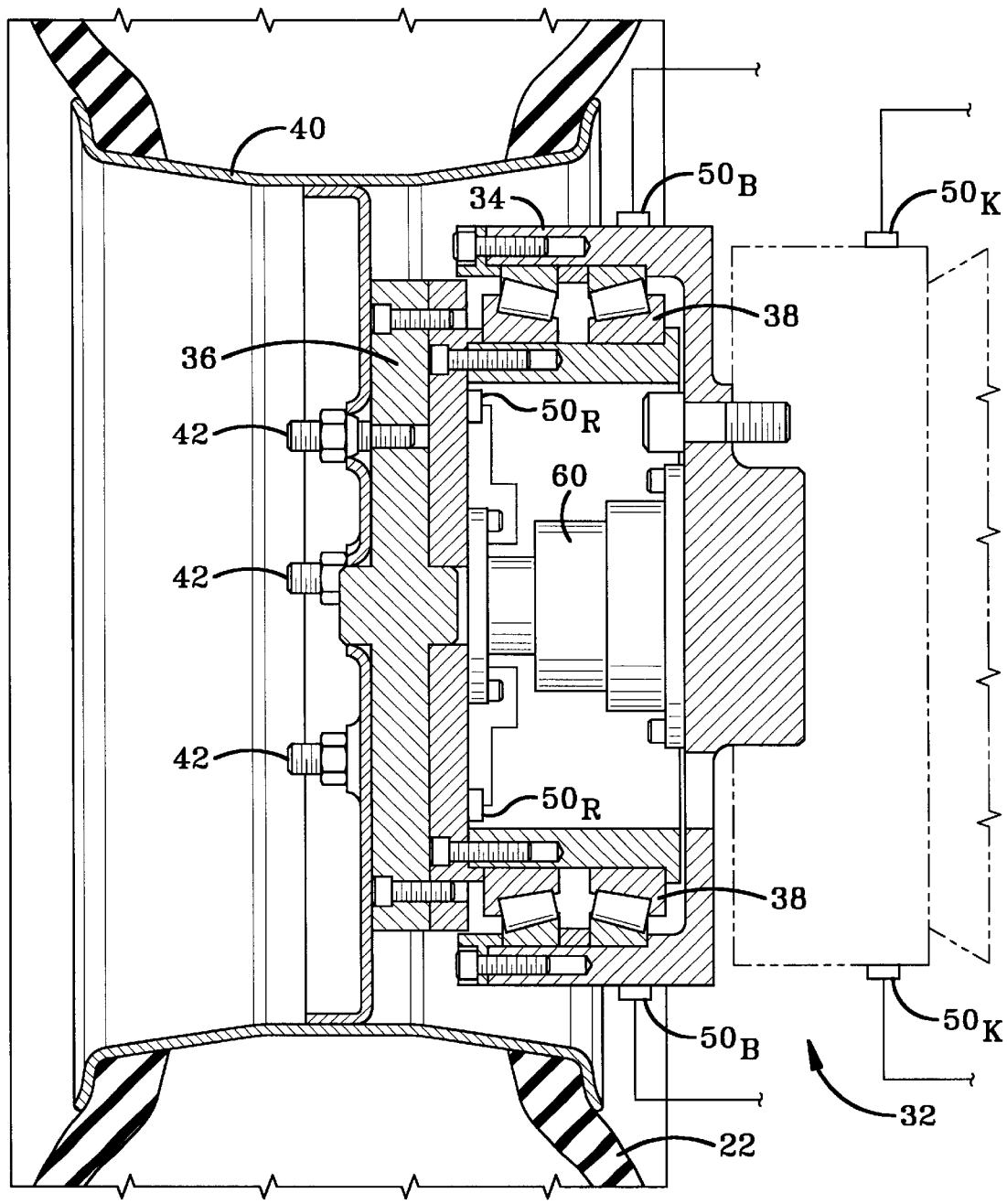
FIG. 3 is a view similar to FIG. 2 with the rotor and bearing housing depicted in section.

A test station according to the concepts of the present invention is indicated generally by the numeral 10 in the accompanying drawings. Test station 10 is used in conjunction with a moving road surface simulator 12 such as the rotating wheel depicted in FIG. 1. The exterior surface 14 of simulator 12 simulates the roughness and frictional characteristics of a typical driving surface. For instance, surface 14 may be configured to simulate a coarse road surface. Most of simulator 12 may be disposed below a floor 16 such that only a small portion 18 is exposed though an opening 20 defined by floor 16. The tire 22 to be tested at station 10 contacts portion 18. Rotation of simulator 12 will cause tire 2 to rotate to simulate a moving vehicle tire.

Station 10 includes a computer 24 that is configured to record the operating conditions of station 10 and forces generated and transmitted by station 10. Computer 24 includes the necessary memory and processing units to store and execute the instructions that make the calculations of the present invention. In one embodiment of the invention, computer 24 may be a personal computer. Station 10 further includes a base 30 that is mounted to floor 16 and supports the other elements of station 10. A force measurement device or load cell 32 is supported by base 30. Base 30 includes a adjustment device that is adapted to move force measurement device 32 and tire 22 with respect to simulator 12 to create a load on tire 22 that simulates the weight of a vehicle. Force measurement device 32 is adapted to measure forces along the X, Y, and Z axes as well as the moments about these axes. One type of force measurement device 32 is known in the art as a Kistler load cell.

A bearing housing 34 is carried by force measurement device 32. Housing 34 rotatably supports a rotor 36 on bearings 38. The structure and operation of bearing housing 34 and rotor 36 are known to those skilled in the art. Tire 22 is mounted to a rim 40 that may be connected to rotor 36 by conventional connectors such as the lug bolts 42 depicted in the drawings.

In the past, tire 22 would be rotated by simulator 12 and force measurement device 32 would record the forces and moments over time. A typical result of this test is depicted by line 44 on FIG. 4. The vertical axis of this graph represents the magnitude of the measured force while the horizontal axis of the graph represents frequency. Line 44 includes all of the forces measured by force measurement device 32, bearing housing 34, and rotor 36. These vibration forces generally occur at higher frequencies and will mask the higher frequency resonances of tire 22 that need to be measured to compare different tire constructions.

In the present system, station 10 is configured to measure the forces of measurement device 32, bearing housing 34, and rotor 36 and account for these forces during the force calculations. This system thus yields only the forces created and transmitted by tire 22 during the test procedure. These forces include the high frequency resonances that are known to occur in tire 22 that were hidden by vibration forces in the past.

Figure 4:
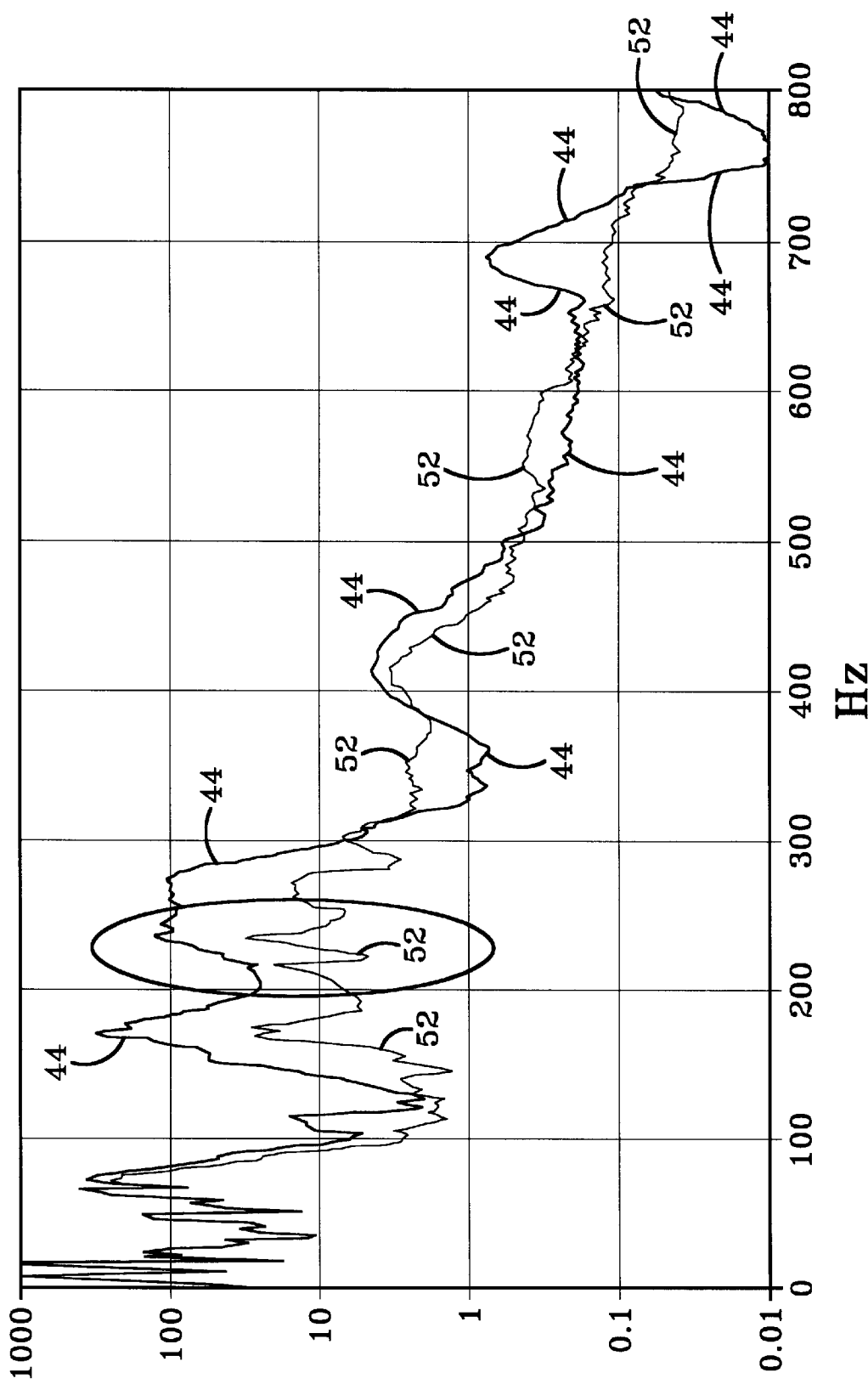
FIG. 4 is a graph showing the results of the prior art system compared to the invention results.

Station 10 includes a force measurement system design to measure the inertial forces generated by the motion of and transmitted by measurement device 32, bearing housing 34, and rotor 36. In the embodiment of the invention depicted in the drawings, four accelerometers $50_{K, B, R}$ are connected to each of measurement device 32, bearing housing 34, and rotor 36 to measure the accelerations of four points disposed about each element. These measurements are combined with the masses of the elements to calculate the forces and moments at their centers of gravity. These forces and moments are combined with the overall measured forces and moments so that the test station forces are accounted for during the test procedure. FIG. 4 depicts line 52 that represents the forces of tire 22 measured by the method of the present invention. One should note that the vertical scale is logarithmic and at some points of line 44 differ from line 52 by a factor of 10. In FIG. 4, the measured tire had known acoustic cavity resonances between 200 and 300 Hz. These resonances are measured by station 10 and identified by the numeral 54.

The forces and moments of each component are calculated by measuring the acceleration of the center of gravity of each component. The acceleration is then multiplied by the mass of the component to calculate the force components at the center of gravity. The force components are then used to calculate the moments of each component. The accelerations of the centers of gravity are measured by mounting accelerometers on each component at known locations with respect to the center of gravity of the component.

Figure 5:
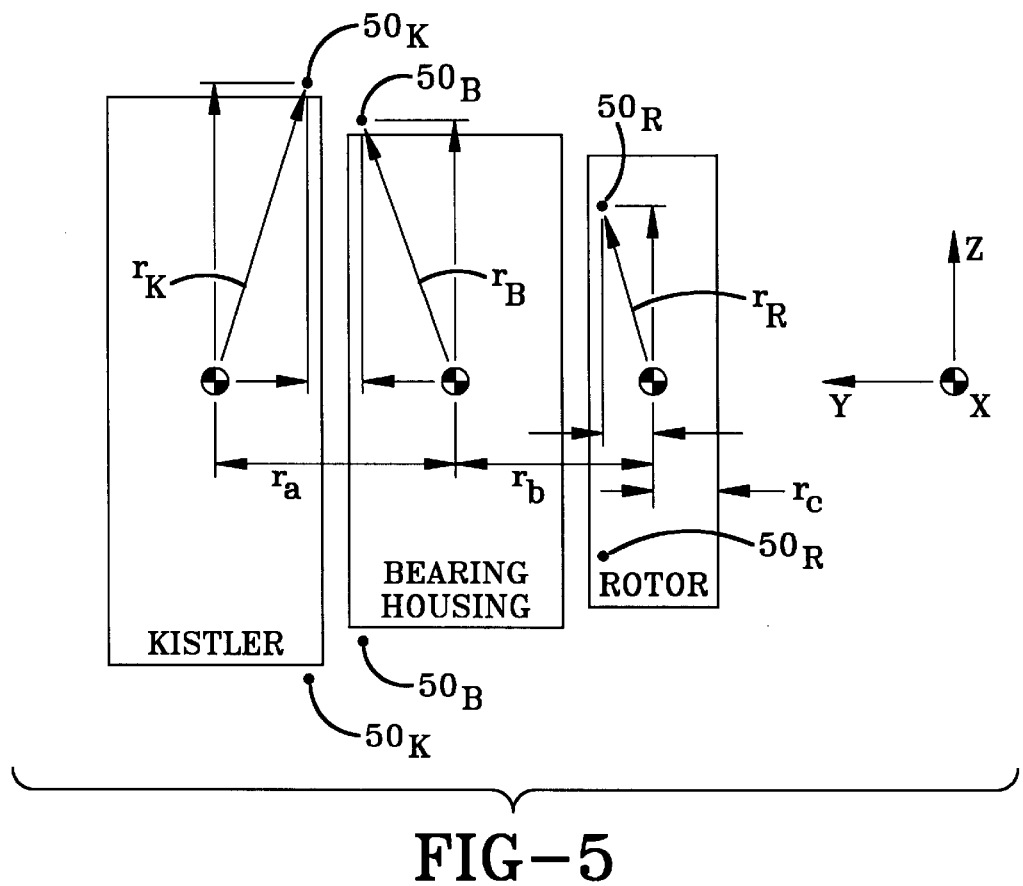
FIG. 5 is model of the system showing how the force equations are developed.
Figure 6:
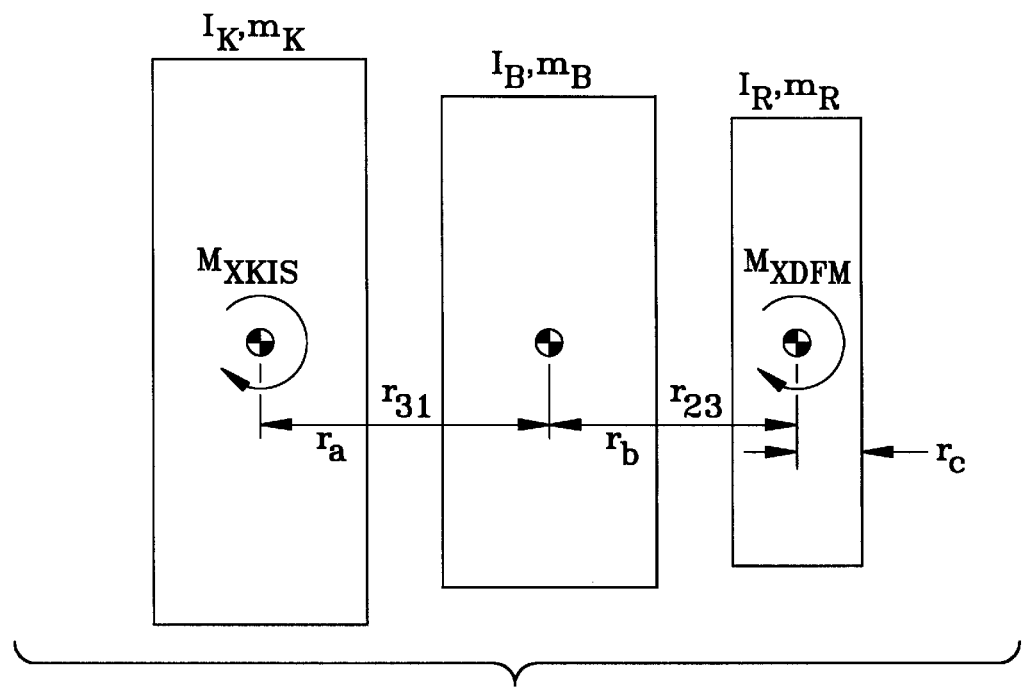
FIG. 6 is model of the system showing how the moment equations are developed.

In one embodiment of the invention, accelerometers 50 are disposed at equally-spaced locations about each element of station 10. Accelerometers 50 may be spaced apart by 90 degrees and are located on the X and Z axes of station 10 as depicted in the model shown in FIG. 5. Accelerometers $50_{K1, K2, K3, and K4}$ may be disposed on the exterior surface of force measurement device 32. Each accelerometer $50_K$ is in communication with computer 24 by a suitable connectors. Accelerometers $50_{B1, B2, B3, and B4}$ may be disposed on the exterior surface of bearing housing 34 and in communication with computer 24 by suitable connectors. Accelerometers $50_{R1, R2, R3, and R4}$ may be disposed on an interior surface of rotor 36 and in communication with computer 24 by suitable connectors. The location of each accelerometer 50 with respect to the center of gravity of its test station component is known so that the acceleration components recorded by the accelerometers may be used to calculate force components at the centers of gravity.

A slip ring 60 may be positioned between rotor 36 and bearing housing 34 to allow accelerometers $50_R$ to rotate with rotor without tangling the connections between computer 24 and accelerometers $50_R$. Slip ring 60 may be a slip ring provided by Michigan Scientific of Charlevoix, Mich. Slip ring 60 allows tire 22 to be quickly mounted onto rotor 36 and dismounted from rotor 36 so that the test procedure of the invention does not require any more time than the test procedure of the prior art. In another embodiment of the invention, slip ring 60 may be positioned outside of rotor 36. In this embodiment, the slip ring must partially disassembled so that tire 22 may be mounted and dismounted.

Each accelerometer 50 is positioned a known vector $52_{K, B, R}$ from the center of gravity $54_{K, B, R}$ such that the acceleration components at the center of gravity $54_{K, B, R}$ can be calculated by summing the acceleration components at all of accelerometers $50_{K, B, R}$. In one embodiment of the invention, accelerometers $50_{K, B, R}$ are sampled at 6250 Hz during the test procedure. The acceleration components $A_{x, y, z}$ are then multiplied by the mass of the component to yield the force components $F_{x, y, z}$ acting on the center of gravities $54_{K, B, R}$. These force measurements are transformed to the frequency domain by performing a Fourier transformation on the time-domain data.

These force measurements are also used to determine the moments created by the test station components. In one embodiment of the invention, the "y" moment component is considered to be negligible and is not considered in the final calculation. The moment in the "y" direction will only yield the moment created by the bearings which has been found to be negligible. The total moment measurement includes the summation of: (1) the moment for the force measurement device 32; (2) the cross product of the moment producing forces in device 32 with their distance to the point of moment summation; (3) the inertial moments due to angular acceleration; and (4) the inertial moments due to translational acceleration of the supporting machine masses. The gyroscopic moment terms are also negligible and are, therefore, ignored. The sum of these moments are added together and used instead of the moments measured by the force measurement device 32.

The measured forces and moments of the test station components are added to the total force measurement in order to yield the forces and moments of the tire. Addition of the forces of the test station components yields the tire forces because of the phase or sign of the test station forces. The phase or sign of these forces causes them to be eliminated from the overall measurements yielding the desired test results.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A test station apparatus for measuring tire force, the apparatus comprising:

a base;

a recording device;

a force measurement device connected to the base; the force measurement device adapted to measure a first set of tire forces;

a bearing housing connected to the force measurement device;

a rotor rotatably mounted to the bearing housing, the rotor adapted to hold a wheel and tire assembly;

at least one accelerometer mounted to the rotor, the accelerometer being in communication with the recording device;

a slip ring connected to the rotor and the bearing housing;

the slip ring providing a portion of the communication between the accelerometer and the recording device; and means for calculating at least one rotor force from data obtained from the at least one accelerometer mounted to the rotor; and means for adding the at least one rotor force to the first set of tire forces.

2. The apparatus of claim 1, wherein four accelerometers are mounted to the rotor.

3. The apparatus of claim 2, wherein the four accelerometers are spaced apart by 90 degrees.

4. The apparatus of claim 1, further comprising at least one accelerometer mounted to the bearing housing.

5. The apparatus of claim 4, wherein four accelerometers are mounted to the bearing housing.

6. The apparatus of claim 5, wherein the four accelerometers are spaced apart by 90 degrees.

7. The apparatus of claim 1, further comprising at least one accelerometer mounted to the force measurement device.

8. The apparatus of claim 7, wherein four accelerometers are mounted to the force measurement device.

9. The apparatus of claim 8, wherein the four accelerometers are spaced apart by 90 degrees.

10. The apparatus of claim 1, further comprising means for rotating the rotor.

11. The apparatus of claim 10, further comprising means for reading the accelerations measured by the accelerometer and calculating the rotor forces.

12. The apparatus of claim 1, wherein the slip ring has a first portion that moves with the rotor and a second portion that is connected to the bearing housing.

13. The apparatus of claim 12, wherein the slip ring is surrounded by the combination of the rotor and the bearing housing.

14. A method of measuring tire forces at a test station apparatus; the method comprising the steps of:

mounting a tire to a test station having a base, a force measurement device, a bearing housing, and a rotor;

rotating the tire and measuring the tire forces with the force measurement device;

calculating the force of at least the rotor; and adding the force calculated for the rotor to the tire force measured by the force measurement device.

15. The method of claim 14, further comprising the steps of calculating the force of at least the bearing housing and adding the force calculated for the bearing housing to the tire force measured by the force measurement device.

16. The method of claim 15, further comprising the steps of calculating the force of at least the force measurement device and adding the force calculated for the force measurement device to the tire force measured by the force measurement device.

17. The method of claim 14, further comprising the step of providing the rotor with four accelerometers.

18. The method of claim 17, further comprising the step of providing the bearing housing with four accelerometers.

19. The method of claim 18, further comprising the step of providing the force measurement device with four accelerometers.

20. The method of claim 14, wherein the step of adding the force calculated for the rotor to the tire force measured by the force measurement device substantially eliminates the force measured for the rotor from the total measured force to yield substantially only the force of the tire.

* * * * *